(12) United States Patent
Bartsch et al.

(10) Patent No.: US 6,560,547 B1
(45) Date of Patent: May 6, 2003

(54) REAL TIME SAMPLING SYSTEM AND METHOD FOR MEASURING AN INTERRUPTED SURFACE

(75) Inventors: Thomas Bartsch, Maple Grove, MN (US); Frank Skog, Plymouth, MN (US)

(73) Assignee: ASI Datamyte, Inc., Minnetonka, MN (US)

( * ) Notice: Subject to any disclaimer, the term of this patent is extended or adjusted under 35 U.S.C. 154(b) by 0 days.

(21) Appl. No.: 09/407,665

(22) Filed: Sep. 28, 1999

(51) Int. Cl.[7] ................................. G01B 5/28
(52) U.S. Cl. ............... 702/35; 347/261; 356/237.2; 356/369; 367/35; 382/136; 382/141
(58) Field of Search ............... 702/33, 35, 40, 702/42, 113, 167, 168; 73/105, 178 R, 597, 633; 356/237.2, 369; 382/141

(56) References Cited

U.S. PATENT DOCUMENTS

| | | | |
|---|---|---|---|
| 4,030,085 A | 6/1977 | Ellis et al. | 340/870.36 |
| 4,138,825 A | 2/1979 | Pelta | 33/228 |
| 4,417,147 A | 11/1983 | Faville | 250/559.14 |
| 4,467,320 A | 8/1984 | McPhee | 341/115 |
| 4,641,966 A * | 2/1987 | Lemmers et al. | 356/237.2 |
| 4,808,958 A | 2/1989 | Hewitt et al. | 336/136 |
| 4,847,548 A | 7/1989 | Lafler | 323/264 |
| 4,920,385 A * | 4/1990 | Clarke et al. | 356/237.2 |
| 4,953,147 A * | 8/1990 | Cobb | 367/35 |
| 4,953,296 A | 9/1990 | Spainhour | 33/203.18 |
| 4,974,261 A * | 11/1990 | Nakahara et al. | 382/141 |
| 5,133,019 A * | 7/1992 | Merton et al. | 382/136 |
| 5,140,534 A | 8/1992 | Miller et al. | 700/279 |
| 5,180,979 A | 1/1993 | Frazzini et al. | 324/207.18 |
| 5,224,272 A | 7/1993 | Toraason et al. | 33/504 |
| 5,333,052 A * | 7/1994 | Finarov | 356/369 |
| 5,469,053 A | 11/1995 | Laughlin | 324/207.18 |
| 5,610,329 A | 3/1997 | Yovichin et al. | 73/146 |
| 5,615,589 A | 4/1997 | Roach | 82/112 |
| 5,818,507 A * | 10/1998 | Genovese | 347/261 |
| 5,825,730 A | 10/1998 | Nishida et al. | 369/44.32 |
| 5,863,136 A | 1/1999 | Miyazaki | 384/512 |

* cited by examiner

Primary Examiner—Kamini Shah
Assistant Examiner—John Le
(74) Attorney, Agent, or Firm—John J. Horn; Amin & Turocy, LLP (57) ABSTRACT

A method and system for diagnosing surface imperfections of an article is provided. A data collection system collects data relating to the surface of the article, and a processor operatively coupled to the data collection system analyzes the surface data to determine deviations in the surface corresponding to surface imperfections and pre-made surface interruptions, and distinguishes between the imperfections and interruptions.

10 Claims, 5 Drawing Sheets

REAL TIME SAMPLING SYSTEM AND METHOD FOR MEASURING AN INTERRUPTED SURFACE

FIELD OF THE INVENTION

The invention herein described relates generally to a system and method for measuring an interrupted surface and, more particularly, to a system and method for measuring an interrupted surface while selectively excluding certain interruptions in or on the surface.

BACKGROUND OF THE INVENTION

Many mechanical systems (e.g., automobile engines) utilize components of precise dimensions and tolerances which require meticulous quality control and inspection to achieve such dimensions and tolerances in order to ensure proper fit and operation. For many objects, measurement of true flatness, roundness, parallelism and the like, or variance therefrom is usually a necessary and often critical requirement. There are various devices for such measuring which generally utilize a probe element that measures variances, or the maximum and minimum height, in the surface of the object. The variance is typically sensed by mechanical means to provide an electrical signal which is proportional to the variance.

Oftentimes, the surface includes one or more cut-outs or raised portions commonly referred to in the art as surface interruptions, which the probe detects and undesirably includes in the data used to determine the surface variances. One such example is in a run-out measurement of the surface of a cylinder having one or more oil slots. The oil slot disrupts the measurement of the surface so that instead of measuring variation in the surface, the probe measures the depth of the oil slot.

Attempts heretofore have been made to measure the maximum and minimum regions in the surface while excluding the interruptions. Thus, others have attempted to exclude an interruption by including some means of identifying the location of the interruption before making the surface measurement. For example, a technician may use a mechanical device such as a mechanical stop wherein, as the object is turned or otherwise moved, the probe element detects that it is approaching the mechanical device and therefore stops taking data. The probe would then exclude data measured for the duration that it detects the mechanical stop. This method is inconvenient and inefficient since it requires the technician to expend time to determine the location of the slot or other interruption and install a stop mechanism prior to making the surface measurement.

Another way of determining the surface of an object having interruptions is to use a position encoder to "track" the position of the object and exclude measurements over a predetermined range on the surface of the part (e.g., excluding measurements taken between 0 and 10 degrees of a cylindrical part as it is rotated). One disadvantage to this method is that if the size of the object varies and the position of the interruption varies from one part to the next, the interruption may fall outside the predetermined range and result in an inaccurate surface measurement. In this regard, oftentimes the interruption is formed in the surface of a part that is then welded to another object. For example, an oil slot may be cut into a bearing that is then welded to the cylinder. The technician may weld the bearing in a position different from that of a previous weld which, again, may create inconsistencies and/or inaccuracies in the surface measurements.

Another disadvantage of excluding interruptions over a predetermined range is that oftentimes the edges of the interruption may fall outside of the range and cause inaccuracies in the measured surface readings. In many cases, the edges of an interruption are the most critical region to include in a surface measurement. In this regard, oftentimes when a cut is made in an object, such as in a cylinder, an abnormality may form at the cut-edge and therefore should be included in the surface measurement indicating a defective cylinder surface.

Still others have attempted to create a profile of the object by, for example, using a detector to actively profile the object. According to this method, every data point is correlated with its previous and/or subsequent data point to determine their relationship to one another and then stored in the memory of a computer for subsequent processing. This method suffers from at least two drawbacks. First, it is limited by the amount of memory available to which the detector is connected. Second, the results are not real-time in the sense that the profile data require after-the-fact analysis to determine the surface measurement.

Consequently, it would be desirable for a system and method that accurately measures a surface while accurately excluding interruptions in the surface.

SUMMARY OF THE INVENTION

The present invention provides a system and method for diagnosing and measuring surface imperfections of an article in real time. The invention excludes unwanted surface interruptions in an efficient way requiring little or no user intervention. More particularly, the present invention excludes surface interruptions by employing a real time sampling system to determine high and low regions in a raised surface and excluding regions in a depressed or lower surface. The present invention determines high and low regions by detecting peak data changes in an incoming set of data. By detecting changes in peak data, minimal memory is required allowing an infinite number of surfaces to be measured over an infinite number of surface interruptions. The surface measurements are resolved in the sampled time period without maintaining historic data samples from previous surface measurements.

One particular aspect of the invention is characterized by a data collection system for collecting data relating to a surface of an article, and a processor operatively coupled to a data collection system for analyzing the surface data to determine deviations in the surface corresponding to surface imperfections and pre-made surface interruptions, and distinguishing between the imperfections and interruptions.

According to yet another aspect of the invention, a method and system for diagnosing surface imperfections of an article is provided. The system is characterized by a means for collecting data values corresponding to levels in the surface, and means for comparing data values corresponding to surface maximums to determine an overall maximum height in the surface and comparing data values corresponding to surface minimums to determine an overall minimum height in the surface. Also, means are provided for setting the overall maximum height equal to a most recent surface maximum data value unless a previous data value is greater. In a similar manner, means are provided for setting the overall minimum height equal to a most recent surface minimum data value unless a previous data value is lower.

According to yet another aspect of the invention, a system for determining run-out in the surface of a cylinder having one or more oil cut slots in its surface is provided. The system is characterized by a probe for collecting data relating to the surface of a cylinder and a controller for analyzing a data value if it corresponds to a portion of the surface between the oil cut slots and excludes a data value if it corresponds to a portion of the surface in, or within a predetermined area of, the one or more oil cut slots. The controller is operative to update a current maximum data value with a subsequent data value if the subsequent data value exceeds the lowest minimum data value between the current and subsequent data values plus a predetermined acceptable noise margin. The controller is further operative to update a current minimum data value with a subsequent data value if the subsequent data value falls below the highest maximum data value between the current and subsequent readings less the predetermined acceptable noise margin.

The foregoing and other features of the invention are hereinafter fully described. The following description and the annexed drawings setting forth in detail one or more illustrative embodiments of the invention, such being indicative, however, of but one or a few of the various ways in which the principles of the invention may be employed.

DETAILED DESCRIPTION

Figure 1:
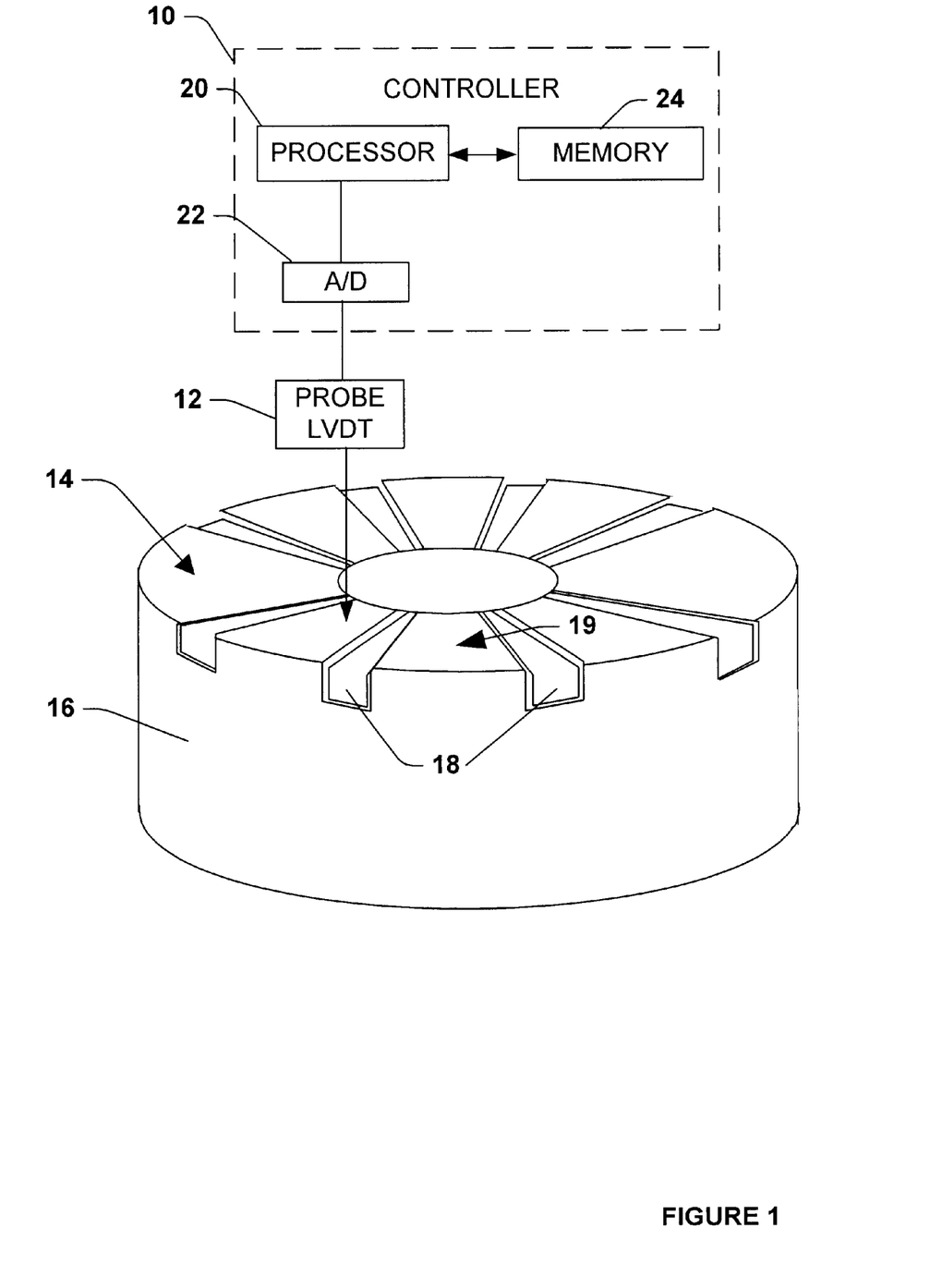
FIG. 1 is a diagrammatic illustration in accordance with the present invention including a probe directed at a surface of an object to be measured.

Referring now to the drawings in detail, and initially to FIG. 1, a controller 10 and a probe 12 in accordance with the present invention are illustrated for measuring a surface 14. The probe 12 measures variations in the surface 14 of an object 16 (e.g., cylinder). The cylinder 16 to be measured may include one or more interruptions 18 in its surface in the form of, for example, cut-away regions such as the radially extending oil cut slots 18 in the cylinder 16. The interruptions 18 are not necessary for a surface measurement and, if included, could generate erroneous results relating to the surface measurement. According to the present invention, the probe 12 takes readings of the entire surface 14 at a prescribed frequency while the controller 10 analyzes the readings and determines if the readings correspond to a surface portion 19 between the interruptions 18 and excludes data corresponding to surface portions in, or in close proximity to, the interruptions 18. Therefore, the interruptions 18 are excluded and data that may otherwise cause erroneous results is eliminated to provide an accurate measurement of the surface 14.

A processor 20, forming part of the controller 10 receives data taken by the probe 12, which is preferably a linear variable differential transformer—LVDT. It must be appreciated however, that other suitable devices capable of relaying surface measurement information may also be employed such as encoders and resolvers. The data is converted from an analog signal to a digital signal by an A/D converter 22. The digital signal, in turn, is analyzed by the processor 20 to determine the relevance, if any, of the particular data. A memory 24 is also provided to retain certain data readings in variables and to enable the controller 10 to relate back and, if appropriate, update the variables.

Figure 2:
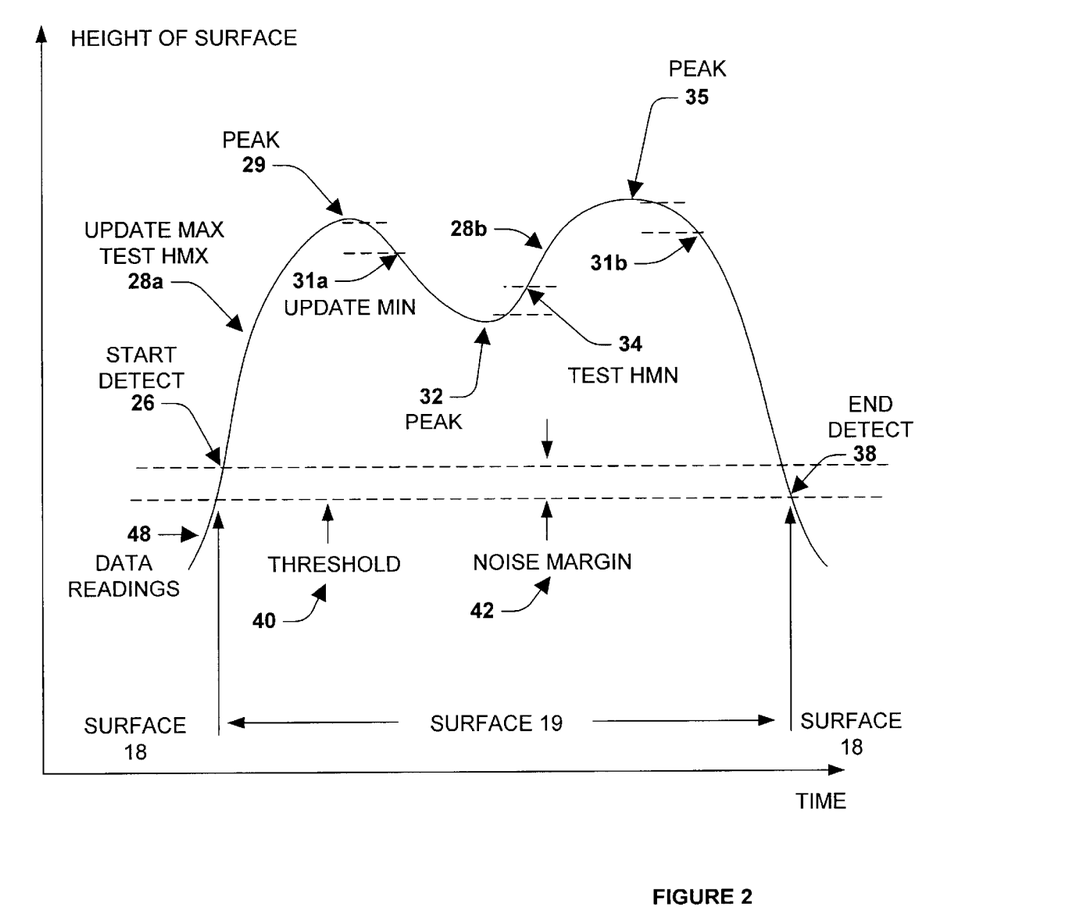
FIG. 2 is a graphical waveform relating to the invention as shown in FIG. 1 and a methodology for the present invention as shown in FIG. 3.

FIG. 2 shows a schematic illustration of a portion of the surface 14 of the cylinder 16 shown in FIG. 1, specifically, a raised portion 19 and two oil slots 18. It is noted that surface 19 is but one of many raised surfaces (referred to as the high signal region) on the surface 14 of cylinder 16 that are to be included in the overall surface measurement. FIG. 2 displays a collection of data readings 48 that follow the raised portion 19 of cylinder 16 as shown in FIG. 1. It is noted that the raised portion 19 is greatly exaggerated to demonstrate the workings of the probe 12 and controller 10. In this regard, the frequency of data collection may vary depending on the particular application. It is noted that data readings are sampled in real time. Therefore, samples may be taken over a plurality of sample periods. Sample periods may vary from relatively long periods (e.g., several seconds) to relatively short periods (e.g., microseconds). It has been found that a suitable sample period for measuring the surface of the cylinder 16 shown in FIG. 1 is about 1 ms.

Referring to FIG. 2, two key parameters and four variables are employed to determine an accurate measurement of the surface 19 shown in FIG. 1. The parameters are a threshold value 40 and a noise margin 42. The variables are a MAX (maximum), a MIN (minimum), a high maximum HMX, and a high minimum, HMN. The term "high" refers to a high signal region. The high signal region, such as shown in FIG. 1 at surface 19, refers to all data readings 48 above the threshold value 40. More particularly, the parameters and variables mentioned above are employed to determine which data readings 48, taken from the surface 19, are to be included or excluded in the surface measurements.

The data readings 48 are included or excluded in the surface 19 measurements based on a predetermined threshold value 40 and a predetermined noise margin 42. As will be described in more detail below, the threshold value 40 and the noise margin 42 are a one-time determination. The threshold value 40 is a minimum value, or level, below which it is desired that data not be included in the surface measurement because, for example, the data may erroneously affect the outcome of the measurement. The threshold value 40 may be determined by a user first taking a preliminary data reading 48, or mapping, of the surface of one or more of the objects to determine high and low levels in the surface. Based on the preliminary data readings, a threshold value 40 is selected below which it is desired to not analyze the data collected, and therefore, exclude the data from the surface measurement.

The noise margin 42 accomplishes two functions. It defines a range of predetermined acceptable variance in the surface of the object; in particular, an acceptable amount of deviation from one data reading 48 to one or more subsequent data readings 48. The noise margin 42 also allows for an acceptable amount of electrical noise in the system, for example, that may incidentally be generated by the probe 12 or controller 10 of FIG. 1. Like the threshold value 40, the noise margin 42 may also be determined by a user and will, of course, depend on acceptable dimensions and tolerances of the objects to be measured. Some objects may require precise dimensions, in which case the noise margin 42 may be selected to be relatively low, while other objects may be more forgiving in the amount of acceptable variance, in which case the noise margin 42 may be selected to be relatively high.

The threshold value 40 and the noise margin 42 may also be determined automatically. For example, the cylinder 16 shown in FIG. 1, may be turned at a constant speed while data readings 48 are received by the controller 10 over the entire surface 14 of the cylinder 16. In real time, the data readings 48 may be analyzed by the controller 10 to determine an average or standard deviation for the minimum regions in the surface 14 below which measurements are to be excluded. From the average or standard deviation of the minimum data readings 48, the threshold value 40 and noise margin 42 may be set at values above the minimum data readings 48 to exclude the desired interruptions in the surface 14. The values above the minimum data readings 48 are determined by the acceptable tolerances and noise levels for the surface to be analyzed.

After the user has configured or the controller 10 has determined, the threshold value 40 and noise margin 42, a surface measurement may begin as data readings 48 are taken from the surface 14. The variables, HMX, HMN, MAX, and MIN, retained in the memory 24 shown in FIG. 1, are employed to determine inclusion or exclusion in the surface 14 measurement.

HMX is an acronym which is defined as high maximum reading. HMX is updated whenever a determination has been made that a peak data reading 48 has exceeded a previous maximum. Like HMX, HMN is an acronym which is defined as high minimum reading and is updated when a determination has been made that a peak data reading 48 is below a previous minimum. In order to avoid confusion, the term "high" should be explained. The term "high" refers to all maximum and minimum "peak" data readings 48 that are above the threshold region 40 known as the high signal region. The peaks are shown as a peak 29, a peak 32, and a peak 35.

In order to determine whether a high maximum or high minimum reading has been attained, two additional parameters are required. The parameters are MAX and MIN. MAX is an acronym for maximum, and MIN is and acronym for minimum. More particularly, these parameters determine which direction the data readings 48 are proceeding, (e.g. increasing values or decreasing values), and when a high maximum or high minimum peak data reading 48 has been attained. For example, a MAX 28a and 28b, are updated when data readings 48 are increasing in value. A MIN 31a and 31b are updated when data readings 48 are decreasing in value.

By observing the data readings 48 of the surface 19 in FIG. 2, the workings of the present invention may be illustrated whereby the data readings 48 above the threshold value 40 are included in the surface measurement and the data readings 48 in regions 18 are excluded from the surface measurement. The present invention functions by detecting changes in data readings 48, excluding the data readings 48 from regions 18, shown to the left of a start detect 26 and to the right of an end detect 38, and including the data readings 48 from region 19. The high data readings 48 at the peaks 29 or 35 are retained when the data readings 48 increase above a previous maximum value. For example, the data reading 48 at the Peak 35 of surface 19 would be retained in HMX as the highest data reading 48 unless a higher data reading 48 was detected along another portion of the surface 14 shown in FIG. 1. The lower peak data readings 48 in surface 19 are retained when the readings rise above an established low data reading 48 at the peak 32.

As shown in FIG. 2, the data readings 48 are detected when the readings increase in value above the threshold region 40 plus the noise margin 42 at the start detect 26. As the data readings 48 increase, the next higher data reading 48 is retained in the variable MAX, shown as Update MAX and Test HMX 28a and 28b. Each time a data reading 48 increases in value, MAX is updated With the current data reading 48, and the variable HMX is tested against MAX to determine if MAX is above the previous value of HMX. If so, HMX is updated with the value of MAX. This demonstrates a particular aspect of the present invention in that data readings 48 to the left of the desired region 19 are excluded because they fall below the threshold value 40. The highest region of surface 19 is retained in HMX at the peak 35.

As the data readings 48 begin to decrease in value below the peak 29 less the noise margin 42, the controller 10 retains the ever decreasing data readings 48 in the variable MIN, shown as Update MIN 31a and 31b. Each time a data reading 48 is less than the previous value of MIN, the existing value of MIN is updated with the current data reading 48. When the data readings 48 have descended to the bottom peak 32, and ascend above the bottom peak 32 plus the noise margin 42, a flag is set and the variable HMN is tested to determine if MIN is less than the value in HMN, shown as Test HMN 34. If MIN is less than the value of HMN, then HMN is updated with the value of MIN. This demonstrates another aspect of the present invention. HMN may only be updated when the data readings 48 have ascended another peak after descending the peak 32. Since HMN is not updated until the data readings 48 rise above the bottom peak 32 plus the noise margin 42, the region to the far right of the desired surface 19 is excluded. Therefore, when descending data readings 48 fall below the threshold 40 without a subsequent increase in value, the readings will be excluded from the surface measurement.

As shown in FIG. 2, the data readings 48 ascend to another peak 35. If the subsequent peak 35 is higher than the previous peak 29, a data reading 48 for the peak 35 will replace the previous HMX reading from peak 29. Likewise, other HMN values are updated if subsequent lower regions above the threshold value 40 are detected. As the data readings 48 fall below the threshold 40, a detection region is ended at an end detect 38.

After the surface 14 has been read and detected, HMX and HMN remain containing the high and low readings from the high signal region. All low regions below the threshold value 40 are excluded from the determination of the surface measurement. HMX and HMN indicate whether the raised regions of the surface 14 are within tolerance. Also, the run-out of the surface 14 may be determined by the controller 10 from the following equation: Run-out=HMX−HMN. The run-out indicates the maximum deviation from high to low on the raised portion of surface 14.

Figure 3:
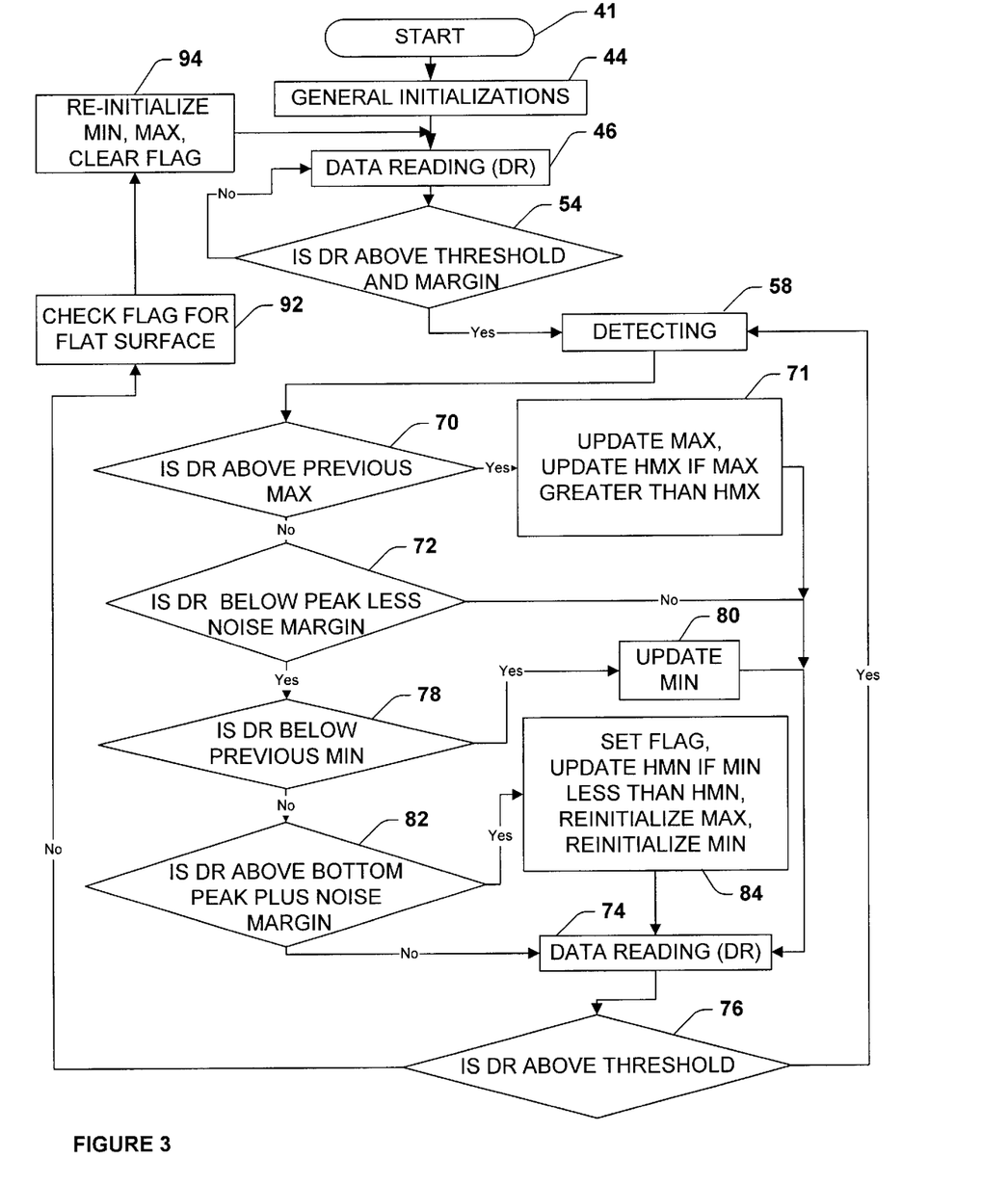
FIG. 3 is a flow chart in accordance with a methodology for carrying out the present invention.

Now referring to FIG. 3, a detailed methodology carrying out the present invention is described. The method of FIG. 3 is explained with reference to the graphical depictions of data readings 48 shown in FIG. 2. It is noted that before measurements begin, a user may enter the threshold value 40 and noise margin 42 or as described above, the controller 10 may automatically determine the threshold and noise margin. At step 44, the method begins with general initializations. The variables, HMX, HMN, MAX, and MIN, are initialized and a flag is cleared. HMX and MAX are set to a maximum negative value that are below any possible low data reading 48 to be detected. HMN and MIN are set to maximum positive values that are above any possible high data reading 48 to be detected.

After the general initialization 44, the method proceeds to step 46 where a data reading 48 is taken. The method then proceeds to step 54 where the data reading 48 is compared to determine if it is above the threshold 40 and the noise margin 42. If the data reading 48 is not above the threshold 40 and noise margin 42, the method proceeds back to step 46 and continues to test the data reading 48 at step 54 until the reading is above the threshold 40 and noise margin 42.

If the data reading 48 is above the threshold 40 plus the noise margin 42 at step 54, the method proceeds to a detecting phase at step 58. At step 58, the method begins a sequence of steps to determine whether the current data reading 48 is an increasing value, decreasing value, a high maximum value, or a high minimum value. At step 70, the method determines whether the current data reading 48 is above the previous MAX by comparing the data reading 48 to MAX. If the data reading 48 is greater than MAX, MAX is updated with the current data reading 48 at step 71 and HMX is updated with the value of MAX if MAX is greater than HMX. After step 71 the method proceeds to step 74 to acquire another data reading 48 and check that the data reading 48 is above the threshold 40 at step 76. Step 76 ends the detecting phase for a particular raised surface when determining that data readings 48 are below the threshold 40.

As the data readings 48 continue to ascend the peak 29 as shown in FIG. 2, MAX is continuously updated in step 71. HMX is also updated if MAX is above the previous value retained in HMX. When the data readings 48 discontinue to ascend the peak 29, the method proceeds to step 72. The method at step 72 then determines whether the current data reading 48 has descended below the peak 29 by comparing MAX with the current data reading 48. If the data reading 48 has not descended below the peak 29 less the noise margin 42, the method returns to step 74 to acquire another data reading 48. If the method determines the current data reading 48 has descended below the peak 29 less the noise margin 42, the method proceeds to step 78.

At step 78, the method determines whether the current data reading 48 is below the previous value of MIN. If the current data reading 48 is less than MIN, the method updates MIN with the current data reading 48 at step 80 and proceeds to step 74 to acquire another data reading 48. As data readings 48 continue to descend to the bottom peak 32, MIN is continuously updated at step 80. When the data readings 48 have discontinued to descend, the method then proceeds to step 82.

At step 82, the method determines if the data reading 48 has ascended above the bottom of the peak 32 plus the noise margin 42. If the data reading 48 has not ascended above the bottom peak 32 plus the noise margin 42, the method proceeds to step 74 to acquire another data reading 48. If the current data reading 48 has ascended above the bottom peak 32 plus the noise margin 42, the method then proceeds to step 84.

At step 84, several variables are updated and a flag is set. HMN is updated with MIN if MIN is less than the previous value in HMN and a flag is set indicating a low region is detected. Also at step 84, MAX is reinitialized with the current data reading 48, and MIN is reinitialized with a maximum positive value. It is possible, albeit unlikely, that a low region may not be detected in a given raised portion of the surface 14 and the flag would not be set since step 84 was not executed. Since HMN is only tested when ascending a peak after descending a previous peak at step 84, it is possible that a flat surface may rise to a maximum then descend below the threshold 40 preventing step 82 from proceeding to step 84. As will be described in more detail in step 92, a flat surface evaluation is performed if the flag is not set.

As the data readings 48 ascend to the peak 35, MAX is continuously updated at step 71 and HMX is updated with MAX if MAX exceeds the previous value of HMX. As the data readings descend the peak 35, MIN is continuously updated with the succeeding lower readings at step 80. As the data readings 48 fall below the threshold value 40, the method proceeds to step 90 from step 76. If the data reading 48 is below the threshold, the end of the detection phase for the raised surface 19 is shown at end detect 38 in FIG. 2 and the method proceeds to step 92.

At step 92, the method determines if the flag was set indicating a low region was detected. If the flag is set, the method proceeds to step 94, wherein the flag is cleared, and MIN and MAX are reinitialized as described above in the general initialization phase at step 44. The method then returns to step 46 and remains in a loop at steps 46 and 54 until the data readings 48 are detected above the threshold value 40 and noise margin 42.

If the flag is not set at step 92, as described above, a relatively flat surface without a low region is indicated. The method at step 92 then compares the value of MAX with HMN. If the value of MAX is less than HMN, HMN is updated with MAX. The method continues to measure other raised surfaces on the cylinder 16, while excluding the depressed regions by following steps 46 through 94 until the entire surface has been measured. At the end of the measurement, a final HMX and HMN remain to determine if the surface measurement is within tolerance. As described above, a run-out determination may be made by subtracting HMN from HMX.

Figure 4:
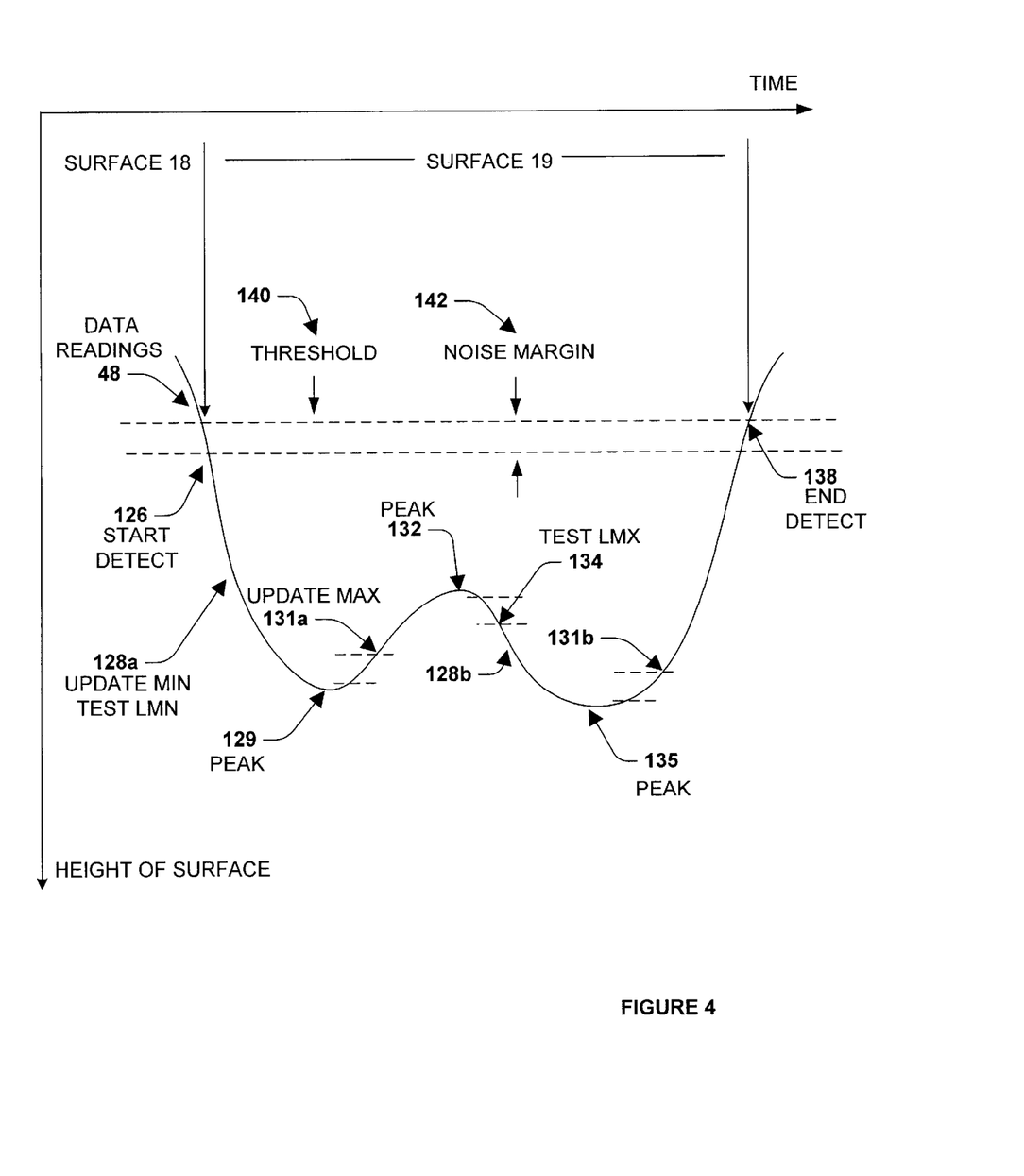
FIG. 4 is a graphical waveform relating to another embodiment of the invention as shown in FIG. 1 and a methodology as shown in FIG. 5.

Referring now to FIG. 4, another embodiment of the present invention is shown. According to the embodiment depicted in FIG. 4, an inverse function may be employed to measure depressed regions in a surface and exclude raised regions. Alternatively, if the probe 12 shown in FIG. 1 were to provide inverse or opposite data readings than shown in FIG. 2, the embodiment shown in FIG. 4 may be employed to measure the raised regions of the surface 14. The embodiment shown in FIG. 4 will be described in reference to the raised surface 19 shown in FIG. 1. As shown in FIG. 4, the data readings 48 proceed in the opposite direction than the data readings 48 shown in FIG. 2 and are exactly the inverse of the readings in FIG. 2.

After a user has configured or the controller 10 has determined, the threshold value 140 and noise margin 142 as described above, a surface measurement may begin as data readings 48 are taken from the surface 14. The variables, LMN, LMX, MAX, and MIN, retained in the memory 24 shown in FIG. 1, are employed to determine inclusion or exclusion in the surface 14 measurement.

LMN is an acronym which is defined as low minimum reading. LMN is updated whenever a determination has been made that a peak data reading 48 has exceeded the previous minimum. Like LMN, LMX is an acronym which is defined as low maximum reading and is updated when a determination has been made that a peak data reading 48 is above the previous maximum. In order to avoid confusion, the term "low" should be explained. The term "low" refers to all maximum and minimum "peak" data readings 48 that are below the threshold region 140 known as the low signal region. The peaks are shown as a peak 129, a peak 132, and a peak 135.

In order to determine whether a low maximum or low minimum reading has been attained, two additional parameters are required. These parameters are MAX and MIN. More particularly, these parameters determine which direction the data readings 48 are proceeding, (e.g. increasing values or decreasing Values), and when a low maximum or low minimum peak data reading 48 has been attained. For example, a MIN 128a and 128b, are updated when data readings 48 are decreasing in value. MAX 131a and 131b are updated when data readings 48 are increasing in value.

By observing the data readings 48 of the surface 19 in FIG. 4, the workings of the present invention may be illustrated whereby the data readings 48 below the threshold value 140 are included in the surface measurement and the data readings 48 in regions 18 are excluded from the surface measurement. The present invention functions by detecting changes in data readings 48, excluding the data readings 48 from regions 18, shown to the left of a start detect 126 and to the right of an end detect 138, and including the data readings 48 from region 19. The low data readings 48 at the peaks 129 or 135 are retained when the data readings 48 decrease below a previous minimum value. For example, the data reading 48 at the peak 135 of surface 19 would be retained in LMN as the lowest data reading 48 unless a lower data reading 48 was detected along another portion of the surface 14 shown in FIG. 1. The higher peak data readings 48 in surface 19 are retained when the readings descend below an established high data reading 48 at the peak 132.

As shown in FIG. 4, the data readings 48 are detected when the readings decrease in value below the threshold region 140 minus the noise margin 142 at the start detect 126. As the data readings 48 decrease, the next lower data reading 48 is retained in the variable MIN, shown as Update MIN and Test LMN 128a and 128b. Each time a data reading 48 decreases in value, MIN is updated with the current data reading 48, and the variable LMN is tested against MIN to determine if MIN is below the previous value of LMN. If so, LMN is updated with the value of MIN. This demonstrates a particular aspect of the present invention in that data readings 48 to the left of the desired region 19 are excluded because they fall above the threshold value 140. The lowest signal reading of surface 19 is retained in LMN at the peak 135.

As the data readings 48 begin to increase in value above the peak 129 plus the noise margin 142, the controller 10 retains the ever increasing data readings 48 in the variable MAX, shown as Update MAX 131a and 131b. Each time a data reading 48 is greater than the previous value of MAX, the existing value of MAX is updated with the current data reading 48. When the data readings 48 have ascended to the peak 132, and descend below the peak 132 less the noise margin 142, a flag is set and the variable LMX is tested to determine if MAX is greater than the value in LMX, shown as Test LMX 134. If MAX is greater than the value of LMX, then LMX is updated with the value of MAX. This demonstrates another aspect of the present invention. LMX may only be updated when the data readings 48 have descended a peak after ascending to the peak 132. Since LMX is not updated until the data readings 48 descend below peak 132 less the noise margin 142, the region to the far right of the desired surface 19 is excluded. Therefore, when ascending data readings 48 rise above the threshold 140 without a subsequent decrease in value, the readings will be excluded from the surface measurement.

As shown in FIG. 4, the data readings 48 descend to another peak 135. If the subsequent peak 135 is lower than the previous peak 129, a data reading 48 for the peak 135 will replace the previous LMN reading from the peak 129. Likewise, other LMX values are updated if subsequent higher readings below the threshold value 140 are detected. As the data readings 48 rise above the threshold 140, a detection region is ended at an end detect 138.

After the surface 14 has been read and detected, LMN and LMX remain containing the high and low readings from the low signal region. All low regions 18 above the threshold value 140 are excluded from the determination of the surface measurement. LMN and LMX indicate whether the raised regions 19 of the surface 14 are within tolerance. Also, the run-out of the surface 14 may be determined by the controller 10 from the following equation: Run-out=LMX−LMN. The run-out indicates the maximum deviation from high to low on the raised portion of surface 14.

Figure 5:
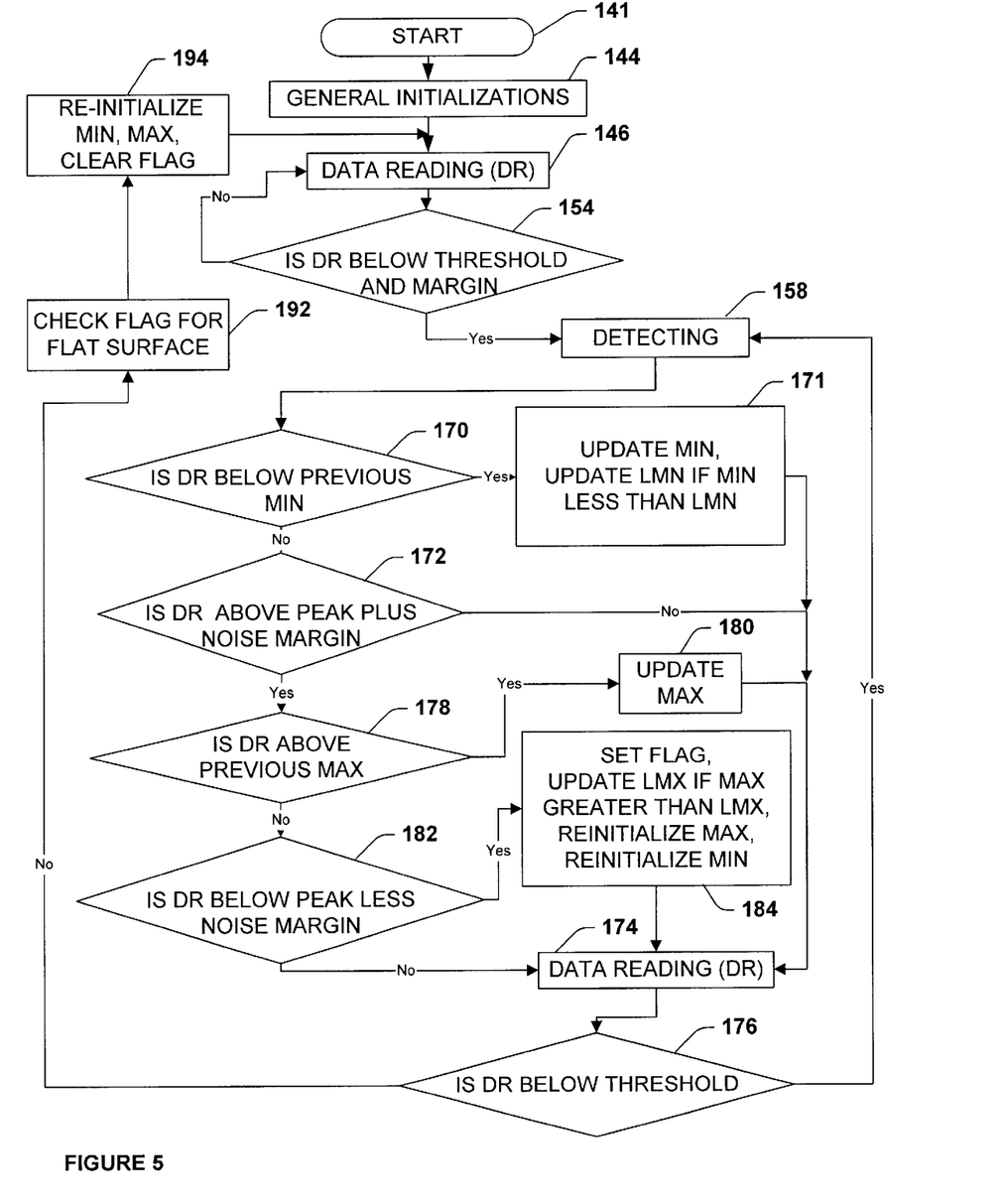
FIG. 5 is a flow chart in accordance with a methodology for carrying out another embodiment of the present invention as shown in FIG. 4.

Now referring to FIG. 5, a detailed methodology carrying out the present invention is described. The method of FIG. 5 is explained with reference to the graphical depictions of data readings 48 shown in FIG. 4. It is noted that before measurements begin, a user may enter the threshold value 140 and noise margin 142 or as described above, the controller 10 may automatically determine the threshold and noise margin. At step 144, the method begins with general initializations. The variables, LMN, LMX, MAX, and MIN, are initialized and a flag is cleared. LMN and MIN are set to a maximum positive value that are above any possible high data reading 48 to be detected. LMX and MAX are set to maximum negative values that are below any possible low data reading 48 to be detected.

After the general initialization 144, the method proceeds to step 146 whereby a data reading 48 is taken. The method then proceeds to step 154 where the data reading 48 is compared to determine if it is below the threshold 140 and the noise margin 142. If the data reading 48 is not below the threshold 140 and noise margin 142, the method proceeds back to step 146 and continues to test the data reading 48 at step 154 until the reading is below the threshold 140 and noise margin 142.

If the data reading 48 is below the threshold 140 and the noise margin 142 at step 154, the method proceeds to a detecting phase at step 158. At step 158, the method begins a sequence of steps to determine whether the current data reading 48 is an increasing value, decreasing value, a low maximum value, or a low minimum value. At step 170, the method determines whether the current data reading 48 is below the previous MIN by comparing the data reading 48 to MIN. If the data reading 48 is less than MIN, MIN is updated with the current data reading 48 at step 171 and LMN is updated with the value of MIN if MIN is less than LMN. After step 171, the method proceeds to step 174 to acquire another data reading 48 and check that the data reading 48 is below the threshold 140 at step 176. Step 176 ends the detecting phase for a particular raised surface 19 when determining that data readings 48 are above the threshold 140.

As the data readings 48 continue to descend the peak 129 as shown in FIG. 4, MIN is continuously updated in step 171. LMN is also updated if MIN is below the previous value retained in LMN. When the data readings 48 discontinue to descend the peak 129, the method proceeds to step 172. The method at step 172 then determines whether the current data reading 48 has ascended above the peak 129 by comparing MIN with the current data reading 48. If the data reading 48 has not ascended above the peak 129 plus the noise margin 142, the method returns to step 174 to acquire another data reading 48. If the method determines the current data reading 48 has ascended above the peak 129 plus the noise margin 142, the method proceeds to step 178.

At step 178, the method determines whether the current data reading 48 is above the previous value of MAX. If the current data reading 48 is greater than MAX, the method updates MAX with the current data reading 48 at step 180 and proceeds to step 174 to acquire another data reading 48. As data readings 48 continue to ascend to the peak 132, MAX is continuously updated at step 180. When the data readings 48 have discontinued to ascend, the method then proceeds to step 182.

At step 182, the method determines if the data reading 48 has descended below the peak 132 less the noise margin 142. If the data reading 48 has not descended below the peak 132 less the noise margin 142, the method proceeds to step 174 to acquire another data reading 48. If the current data reading 48 has descended below the peak 132 less the noise margin 142, the method then proceeds to step 184.

At step 184, several variables are updated and a flag is set. LMX is updated with MAX if MAX is greater than the previous value in LMX and a flag is set indicating a high region was detected. Also at step 184, MIN. is reinitialized with the current data reading 48, and MAX is reinitialized with a maximum negative value. It is possible, albeit unlikely, that a high reading may not be detected in a given raised portion of the surface 14 and the flag would not be set since step 184 was not executed. Since LMX is only tested when descending a peak after ascending a previous peak at step 184, it is possible that a flat surface may fall to a minimum then ascend above the threshold 140 preventing step 182 from proceeding to step 184. As will be described in more detail in step 192, a flat surface evaluation is performed if the flag is not set.

As the data readings 48 descend to the peak 135, MIN is continuously updated at step 171 and LMN is updated with MIN if MIN is less than the previous value of LMN. As the data readings ascend to the right of peak 135 above peak 135 and noise margin, MAX is continuously updated with the succeeding higher readings at step 180. As the data readings 48 rise above the threshold value 140, the method proceeds to step 192 from step 176. If the data reading 48 is above the threshold, the end of the detection phase for the raised surface 19 is shown at end detect 138 in FIG. 4 and the method proceeds to step 192.

At step 192, the method determines if the flag was set indicating an LMX was detected. If the flag is set, the method proceeds to step 194, wherein the flag is cleared, and MIN and MAX are reinitialized as described above in the general initialization phase at step 144. The method then returns to step 146 and remains in a loop at steps 146 and 154 until the data readings 48 are detected below the threshold value 140 and noise margin 142.

If the flag is not set at step 192, as described above, a relatively flat surface without a high reading is indicated. The method at step 192 then compares the value of MIN with LMX. If the value of MIN is greater than LMX, LMX is updated with MIN. The method continues to measure other raised surfaces on the cylinder 16, while excluding the depressed regions by following steps 146 through 194 until the entire surface has been measured. At the end of the measurement, a final LMX and LMN remain to determine if the surface measurement is within tolerance. As described above, a run-out determination may be made by subtracting LMN from LMX.

It is to be appreciated that the methods shown in FIGS. 3 and 5 may be combined to produce a surface measurement for the over all surface whereby only the transition regions from low to high or high to low would be excluded from the surface measurement.

Finally, a direction sensor, such as a position encoder, may be added to track the direction of the cylinder 16. The above methods are susceptible to error if the object being measured suddenly reverses directions. Therefore, an encoder is employed to provide directional exclusion or inclusion of data samples. For example, all data readings 48 may be excluded when the surface is rotating clockwise but exclude when the surface is rotating counter clockwise.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A system for diagnosing surface imperfections of an article, comprising:
   a system for collecting data related to the surface of the article; and
   a processor operatively coupled to the data collection system;
   wherein the processor analyzes the surface data in real time to determine deviations in the surface corresponding to surface imperfections and pre-made surface interruptions, the processor distinguishing between the imperfections and interruptions.

2. The system as set forth in claim 1, wherein the data collection system collects a peak imperfection values of the surface and the processor compares current values with previous values to determine a maximum and a minimum associated with the surface.

3. The system as set forth in claim 1, wherein the processor determines peak imperfections in the surface by updating a high maximum value with progressively higher values above a predetermined threshold.

4. The system as set forth in claim 3, wherein the processor determines peak imperfections in the surface by updating a low maximum value with progressively higher values below a predetermined threshold.

5. The system as set forth in claim 1, wherein the processor determines peak imperfections in the surface by updating a high minimum value with progressively lower values above a predetermined threshold.

6. The system as set forth in claim 5, wherein the processor determines peak imperfections in the surface by updating a low minimum value with progressively lower values below a predetermined threshold.

7. The system as set forth in claim 1, further comprising a direction sensor whereby data values are included in a first direction and excluded in a second direction.

8. A system for diagnosing surface imperfections of an article, comprising:
- a system for collecting data related to the surface of the article; and
- a processor operatively coupled to the data collection system;
- wherein the processor analyzes the surface data in real time to determine deviations in the surface corresponding to surface imperfections and pre-made surface interruptions, the processor distinguishing between the imperfections and interruptions, wherein the data collection system collects maximum and minimum height values of the surface and the processor determines whether the values are below a predetermined threshold, in which case the values are distinguished as interruptions and excluded from surface diagnosis.

9. The system as set forth in claim 8, wherein the processor further determines whether the values are above the threshold plus a predetermined noise margin, in which case the values are distinguished as imperfections and the data collection system commences collecting data to be included in the surface diagnosis.

10. The system as set forth in claims 8 and 9, wherein the processor determines the threshold and noise margin by analyzing the surface and the interruptions to determine a value below which data is to be excluded.

* * * * *